United States Patent
Dahl

(10) Patent No.: US 8,941,625 B2
(45) Date of Patent: Jan. 27, 2015

(54) CONTROL USING MOVEMENTS

(75) Inventor: Tobias Dahl, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 313 days.

(21) Appl. No.: 13/382,898

(22) PCT Filed: Jun. 21, 2010

(86) PCT No.: PCT/GB2010/001215
§ 371 (c)(1),
(2), (4) Date: Apr. 24, 2012

(87) PCT Pub. No.: WO2011/004135
PCT Pub. Date: Jan. 13, 2011

(65) Prior Publication Data
US 2012/0206339 A1    Aug. 16, 2012

(30) Foreign Application Priority Data

Jul. 7, 2009    (GB) .................................. 0911840.7
Mar. 30, 2010   (GB) .................................. 1005345.2

(51) Int. Cl.
G06F 3/043    (2006.01)
G06F 3/0488   (2013.01)

(52) U.S. Cl.
CPC ............ *G06F 3/043* (2013.01); *G06F 3/04883* (2013.01); *G06F 2203/04101* (2013.01)
USPC ........................ 345/177; 345/158; 178/18.04

(58) Field of Classification Search
USPC ................... 345/156, 158, 173, 175–77, 179; 178/18.01, 18.04, 18.09; 702/150; 356/3; 715/781, 863
See application file for complete search history.

(56) References Cited

U.S. PATENT DOCUMENTS

| 5,059,959 | A | 10/1991 | Barry |
| 6,130,663 | A | 10/2000 | Null |
| 6,313,825 | B1 | 11/2001 | Gilbert |
| 6,518,915 | B2 * | 2/2003 | Schutz et al. .................. 342/28 |
| 6,741,237 | B1 | 5/2004 | Benard et al. |
| 8,169,404 | B1 * | 5/2012 | Boillot .......................... 345/158 |
| 8,345,023 | B1 * | 1/2013 | Drennan et al. ............. 345/179 |
| 2001/0012001 | A1 * | 8/2001 | Rekimoto et al. ........... 345/173 |

(Continued)

FOREIGN PATENT DOCUMENTS

| WO | WO 00/39663 | 7/2000 |
| WO | WO 2008/001202 A2 | 1/2008 |

(Continued)

OTHER PUBLICATIONS

PCT, International Search Report and Written Opinion, dated Nov. 10, 2010, for International Application No. PCT/GB2010/001215, filed Jun. 21, 2010.

(Continued)

*Primary Examiner* — Joe H Cheng

(57) ABSTRACT

A movement of an object is recognised as a predetermined movement, by transmitting signals between transmitter-receiver pairs, which are reflected from the object. A first event is recorded for one of the transmitter-receiver pairs if a reflected signal meets a predetermined proximity criterion, and a second event is recorded for a second transmitter-receiver pair if after the first event, a subsequent reflected signal meets a predetermined proximity criterion. The first and second events are used to identify the movement.

21 Claims, 6 Drawing Sheets

(56) References Cited

U.S. PATENT DOCUMENTS

| | | |
|---|---|---|
| 2006/0238490 A1 | 10/2006 | Stanley et al. |
| 2007/0121097 A1 | 5/2007 | Boillot |
| 2007/0211022 A1 | 9/2007 | Boillot |
| 2007/0288194 A1 | 12/2007 | Boillot |
| 2008/0059915 A1* | 3/2008 | Boillot .......................... 715/863 |
| 2008/0100572 A1 | 5/2008 | Boillot |
| 2008/0122803 A1* | 5/2008 | Izadi et al. .................... 345/175 |
| 2008/0252595 A1* | 10/2008 | Boillot .......................... 345/156 |
| 2010/0245289 A1* | 9/2010 | Svajda .......................... 345/175 |
| 2010/0271331 A1* | 10/2010 | Alameh et al. ................ 345/175 |
| 2011/0074723 A1* | 3/2011 | Reynolds ...................... 345/173 |
| 2011/0148798 A1* | 6/2011 | Dahl .............................. 345/173 |
| 2012/0243374 A1* | 9/2012 | Dahl et al. ...................... 367/93 |
| 2013/0155031 A1* | 6/2013 | Dahl et al. .................... 345/177 |

FOREIGN PATENT DOCUMENTS

| | | |
|---|---|---|
| WO | WO 2008/110895 A2 | 9/2008 |
| WO | WO 2009/147398 A2 | 12/2009 |

OTHER PUBLICATIONS

Ishikawa, et al., Touchless Input Device and Gesture Commands, IEEE, 2005, pp. 205-206.

* cited by examiner

CONTROL USING MOVEMENTS

RELATED APPLICATIONS

This application is the National Stage of International Application No. PCT/GB2010/001215, filed Jun. 21, 2010, which claims the benefit of GB 1005345.2, filed Mar. 30, 2010, and GB 0911840.7, filed Jul. 7, 2009. Each of these applications is hereby expressly incorporated by reference in its entirety herein.

BACKGROUND OF THE TECHNOLOGY

This invention relates to methods and apparatus for identifying a predetermined movement of an object; in particular, in some embodiments, for identifying a gesture by a human hand for the purposes of providing a gesture-based user interface to an electronic device.

It is known to track the movement of an object, such as a user's finger or hand, by transmitting a succession of signals (e.g. ultrasound pulses) from one or more transmitters, receiving reflected signals at one or more receivers, and tracking movement of one or more objects by analysing changes in the received signals over time. It has been proposed to apply such technology to user interfaces for electronic devices, enabling, for example, a finger tip or hand to be moved in order to control an on-screen cursor. Arrangements similar to this are described in U.S. Pat. No. 5,059,959 (Barry) and U.S. Pat. No. 6,313,825 (Gilbert).

Such an approach, however, requires a high level of computational processing in order to track the object. This need for dedicated processing and electrical power is undesirable; particularly so in the context of resource-constrained mobile devices. The Applicant has realised that such a resource-intensive tracking approach is not necessary in some circumstances, particularly when the movements of interest take place close to a screen or other defined surface. Furthermore, conventional tracking methods may have difficulty in discerning the direction of an object using baseline time-of-flight or array based methods due to the speed at which the object moves, and its continually changing 'shape' relative to the transducer setup. Conventional tracking methods also rely on there being a clear point reflector or a clear front to track.

SUMMARY OF CERTAIN INVENTIVE ASPECTS

When viewed from a first aspect, the invention provides a method of recognising a movement of an object as one of a set of one or more possible predetermined movements, the method comprising:
continuously or repeatedly transmitting signals between at least two transmitter-receiver pairs, said signals being reflected from said object to produce reflected signals;
recording a first event for a first one of said transmitter-receiver pairs if a said reflected signal meets a predetermined proximity criterion;
recording a second event for a second one of said transmitter-receiver pairs if, after the first event, a subsequent reflected signal meets the or a further predetermined proximity criterion; and
using said first and second events to identify said movement as the or one of the predetermined movements.

The invention extends to apparatus for recognising a movement of an object as one of a set of one or more possible predetermined movements, comprising at least two transmitter-receiver pairs; and an electronic controller arranged to:
continuously or repeatedly transmit signals between said at least two transmitter-receiver pairs, said signals being reflected from said object to produce reflected signals;
record a first event for a first one of said transmitter-receiver pairs when a said reflected signal meets a predetermined proximity criterion;
record a second event for a second one of said transmitter-receiver pairs when, after the first event, a subsequent reflected signal meets the or a further predetermined proximity criterion; and
electronic processing means arranged to use said first and second events to identify said movement as the or one of the predetermined movements.

The invention also extends to a computer software product, and to a carrier bearing the same, configured, when run on a computer, to recognise a movement of an object as one of a set of one or more possible predetermined movements, the software comprising logic arranged to:
receive data resulting from continuously or repeatedly transmitting signals between at least two transmitter-receiver pairs, said signals being reflected from said object to produce reflected signals;
recording a first event for a first one of said transmitter-receiver pairs if said data represents a said reflected signal meeting a predetermined proximity criterion;
recording a second event for a second one of said transmitter-receiver pairs if, after the first event, said data represents a subsequent reflected signal meeting the or a further predetermined proximity criterion; and
using said first and second events to identify said movement as the or one of the predetermined movements.

The above-mentioned predetermined criterion may be a first predetermined proximity criterion with the above-mentioned further predetermined criterion being a second predetermined proximity criterion Thus it will be seen by those skilled in the art that, in accordance with the invention, certain movements of an object, conveniently a human hand, can be recognised. However rather than using computationally-expensive and technically-difficult precise tracking of the location of the object in three-dimensional space, such recognition is made by detecting the object with two different transmitter-receiver pairs at different times. The Applicant has appreciated that this, together with knowledge of the placement of the transducers of two transmitter-receiver pairs, can be used to identify the movement. For example the order in which the first and second events occur may be used to recognise a sweeping gesture from left to right across the face of a screen such as a computer display. This could then be used e.g. to effect a scroll or other sideways movement of something displayed on the screen.

The proposed event-based gesture recognition method does not need the assumption of a clear point reflector or clear front to track. Instead it is based on two events being detected in two similar but spaced channels; or two channels more generally. In fact, the details of the reflected signals could be hard to identify and interpret even for a skilled observer, but could nevertheless be used for precise gesture recognition using the proposed invention.

The predetermined set of movements could be a discrete set or a continuous set.

The proximity criteria could comprise or make use of instantaneous signals, i.e. simply those received in a single given time-slot. However they are not limited to this and could equally be based on signals over a number of, e.g. adjacent timeslots; for example the criteria could comprise an average, or a gradient or other trend.

In the preferred set of embodiments the transmitter and receiver of each pair are separated from one another across at least part of a control surface. In some embodiments this could be a passive area designated for recognising movements performed over it, but in many advantageous embodiments the control surface comprises a display for an electronic device such as a computer so as to allow interaction with the device through the movements recognised.

Preferably for each pair, the transmitter is on an opposite side of the control surface to the receiver. In general in accordance with the invention it is preferred to employ discrete transducers that are separated from one another as opposed to being provided in an array (in the sense in which that term is understood by those skilled in the art).

The Applicant has found that this approach is most useful when the object is moving close to the control surface. The predetermined proximity criterion/criteria can be used to ensure this. It/they could comprise a maximum time of flight of the acoustic signal from the transmitter to the receiver via the object; that is, a maximum bound on the sum of the distance from the transmitter of a transmitter-receiver pair to the object and the distance from the object to the receiver of the transmitter-receiver pair. Such a bound effectively defines an ellipsoid boundary for a transmitter-receiver pair within which the object must lie in order to satisfy the proximity criterion for that transmitter-receiver pair. In some embodiments the proximity criteria could be defined relative to the control surface.

Additionally or alternatively, the proximity criterion/criteria could comprise a minimum energy reflected from the object. It will be seen that both of this and the time-of-flight technique effectively give a measure of how close the object is to the screen or other control surface (if such is present). The invention includes any other technique for determining such proximity.

Having the proximity criteria configured such that only gestures close to a screen are detected is beneficial in the context of a computer, particularly a laptop, since false detections from typing on a keyboard can more easily be avoided.

Whilst not essential, it is preferred that the signals are acoustic, e.g. ultrasonic signals.

Where a control surface such as a display screen is provided and movements need to be recognized close to that surface, the Applicant has appreciated an advantage of using acoustic signals, namely that by using omni-directional or partially omni-directional transmitters and receivers it is not necessary to have them projecting out of the plane of the screen or other surface. Rather, one or more of them can be mounted flush with or below the surface. This is significant from an aesthetic design point of view.

Simplistically and typically the proximity criterion for recording the first and second events would be the same. However this is not essential. For example the criterion could differ between the transmitter-receiver pairs. This would amount to the 'sensitivity zone' being asymmetric which might be desirable in some applications. Equally the criteria could differ between the first and second event recordal. For example the first event may require the object to be closer than for the second event to minimise false detections.

As the first and second events relate to signals transmitted at different times (either different discrete transmissions or different portions of a continuous transmission) they do not simply correspond to different perspectives of the object when it has not significantly moved but are triggered only because the object is moving. In the simplest embodiments the events simply give a binary indication of whether or not the object is in a detection zone defined by the positions of the transmitter and receiver and the proximity criterion. However the order in which the object passes between two or more of these zones can be usefully used to detect movements.

In accordance with the invention the first event might be recorded before receipt of the signals transmitted at a later time and which give rise to the second event. However this is not essential nor indeed typical. More typically, unless the movement of the object is very slow, the first event is only identified and recorded after the signals corresponding to both events have been received. Once the first event has been recorded, the received signals (which are stored in a buffer or other storage) can be analysed to determine and record the second event and so identify the gesture.

In preferred embodiments a quantitative measure of the proximity of the object to the respective transmitter-receiver pairs is made. Comparing the quantitative measures allows the first and/or second events to be recorded in respect of the transmitter-receiver pair closest to the object—i.e. which has the highest proximity measure. This allows the detection zones referred to above to overlap; in which case the quantitative comparison amounts to a determination of which zone the object is closest to the centre of. For example where time-of-flight is used to determine proximity, if the respective ellipsoids defined by the maximum time-of-flight condition overlap, the quantitative comparison is equivalent to defining a virtual boundary surface through the intersection region of the ellipsoids, with the object causing an event to be recorded for one pair if it is on one side of the virtual boundary, and an event for a different pair if it is on the other side.

The first and second events may be used in any appropriate way to identify the movement as the or one of the predetermined movements. In a set of embodiments, only the identity of the transmitter-receiver pairs corresponding to the first and second events (their locations of course being known) and the order in which they occur are used. However, in other embodiments, other factors such as the time interval between the first and second events (a measure of the speed with which the movement is executed) and/or the quantitative measure mentioned above corresponding to each of the events may be used.

The idea of recognising a movement depending on the identity of transmitter-receiver pairs satisfying predetermined criteria for reflected signals is new and inventive in its own right and thus, when viewed from a second aspect, the invention provides a method for recognising a movement of an object as one of a set of one or more possible predetermined movements, said method comprising determining an acoustic signal travelling between a first transmitter-receiver pair via an object to meet a first predetermined proximity criterion; determining a further acoustic signal travelling between a second transmitter-receiver pair via said object to meet a second predetermined proximity criterion; returning an indication that the, or one of the, predetermined movement(s) has taken place depending on which transmitters and receivers form the respective first and second transmitter-receiver pairs.

This aspect extends to apparatus for recognising a movement of an object as one of a set of one or more possible predetermined movements, comprising processing means configured to:

determine that an acoustic signal travelling between a first transmitter-receiver pair via an object meets a first predetermined proximity criterion;

determine that a further acoustic signal travelling between a second transmitter-receiver pair via said object meets a second predetermined proximity criterion; and return an indication that the predetermined movement, or one of the predetermined movements, has taken place depending on which transmitters and receivers form the respective first and second transmitter-receiver pairs.

In any aspect of the invention, processing means may comprise one or more computer processors, or silicon chips, such as an ASIC or FPGA. It may comprise a plurality of separate processors, connected by communication links.

In a set of embodiments the first and/or second predetermined proximity criteria comprise a maximum time of flight of the acoustic signal from the transmitter to the receiver via the object. One or both may additionally or alternatively comprise a minimum energy reflected from said object. In some embodiments, the first criterion is the same as the second criterion.

As for the previous aspects of the invention, in some embodiments, the proximity criterion comprises a trend e.g. a maximum or minimum rate of change in a value, or simply the sign of the change—positive or negative. This could be an increase or decrease of reflected energy over a period of time, or a trend of increasing or decreasing of proximity over a period of time.

Other preferred features of the previous aspect may also be preferred features of this aspect.

When viewed from another aspect, the invention provides a method of recognising a gesture comprising using the order in which detection of an object is made by different pairs of acoustic transmitters and receivers.

This extends to apparatus comprising a plurality of transmitter-receiver pairs and processing means configured to recognise a gesture using the order in which detection of an object is made by the different pairs.

Preferably the transmitter and receiver of each pair lie across at least part of a predetermined active region.

In some embodiments the detection uses time of flight of the signal. Additionally or alternatively it uses energy reflected by the object. Additionally or alternatively, it uses time of flight and/or energy for multiple echoes or echo profiles.

The use of multiple echoes or a full echo-profile has important consequences. In many standard applications, ultrasonic ranging sensors are used as "single-range" measurement devices. For example, the SensComp 600 Series Smart Sensor from SensComp, Inc. of Michigan, US will output a single range to an object, such as a wall or a person. In carrying out this distance measurement, however, a series of received echoic signal are analyzed, and only one is detected as stemming from the object of interest. From this perspective, such an ultrasonic ranging device is similar to an infra-red ranging system, in that a single number readout is provided. In doing so however, the other echoic taps, i.e. the rest of the echoic profile is discarded. For applications such as the ones described herein, the full echo profile, or parts of it, may be very important. Using such profiles, one can for instance process multiple objects located at multiple ranges. Importantly, it allows the question of "where is the object, and is it within a certain range interval" to be replaced by the question "is there an object within this specific range interval". The first question can be seen to be one favouring selection before measurement. The second allows measurement without selection. In practice, this means that for instance a proximity criterion, such as outlined elsewhere in this application, can be set to detect whether there is an object present within a certain range interval, i.e. by using an energy detector, an edge detector, or a envelope shape detector applied to a certain portion of the return signal, or an impulse response. This detector could be oblivious as to whether there are other objects at other ranges, some of which would normally trigger an off-the-shelf ultrasonic ranging system.

In contrast, single-sensor or few-sensor infrared systems do not have the ability to process echoic profiles, and in detecting a most likely range for an object as it moves along a path, may have large variances in the readouts during the movement. In the event that an object, such as a hand, is moved in a non-rigid fashion, such as a scoop, an infrared single-ranging sensing system is "faced with the dilemma" of reporting the distance to the fingertips, which are moving, or to the wrist, which is static. Due to the fast speed of light, the reflections stemming from those two objects cannot be resolved while keeping a sufficiently wide opening angle, such as is required to capture the movement of a hand. As a consequence, infrared sensing systems facing this 'range-smearing' problem may favour the rigid motion of an object past sensors. This could be an extended hand, or a finger extended out from a hand of which the palm is parallel with the surface to which the sensors are mounted.

Typically, by working with parts of the echo profile as opposed to a single range, the ultrasonic solution does not have this problem. As will be seen, acoustic, especially ultrasonic arrangements described herein in accordance with the invention may effectively 'reuse' the data that is normally wasted or thrown out in typical echo-location systems, and which is unavailable in infrared systems due to range-smearing.

Where reference is made herein to "time-of-flight" measurements, this should be understood to include a time-of-flight measurement extracted from a plurality of possible candidates given by the echoic profile.

When viewed from a further aspect, the invention provides a method of identifying motion of an object from a first region to a second region, comprising:
  using a first acoustic signal to determine that, at a first time, the object is located in said first region;
  using a second acoustic signal to determine that, at a second, later time, the object is located in the second region;
  storing the results of said determinations in an electronic register or memory; and
  identifying motion of the object from the first region to the second region if the results of said first and second determinations are both positive.

Although in accordance with the invention at least two transmitter-receiver pairs are provided, this does not necessarily imply that they are fully independent, i.e. with one transmitter and one receiver for use solely by that pair. For example the two pairs could share a common transmitter or a common receiver to reduce the number of parts required. A single transducer may be able to perform the function of both a transmitter and a receiver; in such cases the transducer would typically act as the transmitter of one transmitter-receiver pair and the receiver of a different transmitter-receiver pair, although it could act as both transmitter and receiver for a single transmitter-receiver pair.

In the case of there being more than one transmitter, it is desirable that the signals transmitted by each transmitter, and their echoes, can be differentiated from each other. This may be accomplished by transmitting the signals such that they do not overlap. Alternatively or additionally, the signals from each transmitter may have a different base frequency to each other and/or be differently encoded using a suitable encoding scheme.

Equally the invention is not limited to having just two transmitter-receiver pairs; in fact any number of pairs could be provided. Clearly the more pairs provided, the more zones there will be which allows more complex and more variety of movements to be recognised. It also means that the zones can be smaller and/or more closely spaced which allows smaller movements to be detected. By appropriate placement of a numerous transmitter-receiver pairs across a control surface, particularly such that there are criss-crossing detection zones to form a grid, embodiments of the invention can allow a degree of two-dimensional location relative the surface to be inferred such that basic tracking could be contemplated. Whilst this is within the scope of the invention, the Applicant's other applications disclose better ways of achieving tracking if that is the goal. Nonetheless it is envisaged that there may be circumstances where the tracking accuracy requirement is such that this approach is advantageous over other methods.

In most aspects of the invention the signals employed are acoustic, preferably ultrasonic. The use of ultrasound is particularly advantageous due to its inaudibility to humans and its relatively slow speed of travel through air, which avoids the need for the high clock-speed equipment needed for speed-of-light timing. This enables existing designs for personal electronic equipment, such as mobile telephones, PDAs and electronic photograph-frames, to be adapted easily to use the present invention at relatively low cost.

Furthermore the propagation characteristics of ultrasound mean that the transmitters and receivers may be shallow or even flush-mounted with a surface (for example, a flat-panel display screen) while still being able to emit and receive sound through a wide range of angles (e.g. potentially a full hemisphere). This is in contrast to a light source and sensor (e.g. a camera), which would typically need one or more lenses (e.g. a fish-eye lens) to protrude from the mounting surface in order to obtain a comparably wide field of emission or view; such protrusion can be disadvantageous aesthetically, but also technically due to an increased risk of soiling or damage to the lens or other associated components.

Another benefit of using ultrasound which the Applicant has appreciated is that the transducers are flexible in terms of how they can be used. For instance transducers used to implement the present invention might also be usable for a fine tracking system, e.g. based on the analysis of impulse responses, with appropriate different analysis of the received signals and possibly also different signal transmission. The necessary changes could though be implemented completely in software, so that a given device could be used either for recognising movements as described herein, or for position tracking. With appropriate transmission signals and analysis, both modes could even be operated simultaneously.

A further important advantage of using ultrasonic transducers in this context, is that they can be used to discern objects from one another based on range, whilst being insensitive to the angle. This means that an ultrasonic solution—whilst 'smearing' objects having similar range but different angles—is also 'robust' or 'indifferent' with respect to the angle of the moving object relative to the transducer setup. When detecting a gesture using a transmitter and a receiver located on the top and bottom of a screen, respectively for example, the detection of a left or right gesture is fairly insensitive to how far up on the screen the hand is moving—i.e. it is insensitive to the angle between the transmitter, the hand and the tracking surface. It could be zero degrees, 45 degrees or even 90 degrees. By contrast an infrared system will typically have a limited angular opening in order to sharply filter out movements not coming from within a specific angular cone. This cone can be widened, but this results in a 'range-smearing', i.e. if there within the 'target zone' is more than a single reflector, or if the reflector is not a point-reflector, the resulting range read-out is at the best an 'average range' and at the worst, a range not representative of any point lying within the intended tracking space. This latter effect is a direct consequence of the speed of light. By comparison the relatively very slow speed of ultrasound can enable meaningful readouts suitable for gesture detection.

A yet further advantage of the omni-directional nature of ultrasound is that it gives an ability to recognize gestures beyond the edge of a control surface. For instance, the proximity criteria could be used to recognize a right movement gesture above the screen, or an up or down motion at the side of the screen, effectively increasing the size of the workspace. Such operation would be impossible using ordinary infra-red sensors.

Each transmit signal might be a continuous signal which would then preferably be of non-constant frequency or non-constant amplitude. Alternatively a sequence of discrete signals is transmitted. In a simple embodiment these discrete signals could each be a single impulse or spike, i.e. approximating a Dirac delta function within the limitations of the available bandwidth. In other embodiments each of the discrete signals could be composed of a series or train of pulses. This gives a better signal-to-noise ratio than a single pulse. In other embodiments each discrete signal could comprise or consist of one or more chirps—i.e. a signal with rising or falling frequency.

In preferred embodiments of the invention the movement recognition is used to control an electronic device. For example each of the predetermined movements which can be recognised could correspond to a different operation of the device.

When viewed from a further aspect, the invention provides a movement-controlled electronic device comprising:
a control surface;
three or more acoustic transducers arranged around a perimeter of said control surface so as to form at least two transmitter-receiver pairs in which the transmitter and receiver of each pair lie across at least a part of the control surface from each other; and
means for controlling an operation of said device in response to a movement identified from signals detected by both of said transmitter-receiver pairs.

The three transducers may consist of two transmitters and one receiver, but preferably consist of one transmitter and two receivers. The device may comprise further transmitters and/or receivers arranged to act independently of the aforesaid three transducers, or in cooperation with one or more of them.

Preferably the signals detected by the receivers of the respective transmitter-receiver pairs are transmitted at different times.

In some aspects of the invention, an input to a device is obtained by applying predetermined proximity criteria to reflected signals received over two or more channels. However the invention is not restricted to the use of proximity criteria. Computationally-efficient, gesture-based input can also be realised using algorithms other than proximity criteria.

Thus, from a further aspect, the invention provides a method of receiving input to a system through motion of an object, comprising:
transmitting an acoustic signal and receiving a reflection of the signal off the object over a first channel comprising at least one acoustic transmitter and at least one acoustic receiver;
receiving a reflection of an acoustic signal off the object over a second channel comprising at least one acoustic transmitter and at least one acoustic receiver;

applying a first algorithm to information relating to the reflection received over the first channel to determine a first set of information about the location or motion of the object;

applying a second algorithm, different from the first algorithm, to information relating to the reflection received over the second channel to determine a second set of information about the motion of the object; and using said first and second sets of information to determine an input to the system.

The invention extends to apparatus arranged to receive input through motion of an object, comprising:

transmission means arranged to transmit an acoustic signal;

receiving means defining first and second channels with the transmission means, each channel comprising at least one acoustic transmitter and at least one acoustic receiver, the receiving means being arranged to receive a reflection of the acoustic signal off the object over the first channel, and to receive a reflection of an acoustic signal off the object over the second channel; and processing means configured to:

apply a first algorithm to information relating to the reflection received over the first channel to determine a first set of information about the location or motion of the object;

apply a second algorithm, different from the first algorithm, to information relating to the reflection received over the second channel to determine a second set of information about the motion of the object; and use said first and second sets of information to determine an input to the apparatus.

The invention also extends to a computer software product, and to a carrier bearing the same, configured, when run on a computer, to cause a system to receive input through motion of an object, comprising:

instructions for transmitting an acoustic signal;

logic arranged to receive information relating to a reflection of the acoustic signal off the object received over a first channel comprising at least one acoustic transmitter and at least one acoustic receiver, and to process this information to determine a first set of information about the location or motion of the object;

logic arranged to receive information relating to a reflection of an acoustic signal off the object received over a second channel comprising at least one acoustic transmitter and at least one acoustic receiver, and to process this information to determine a second set of information about the motion of the object; and logic arranged to use said first and second sets of information to determine an input to the apparatus.

By making use of two different algorithms over two different channels, efficient recognition of input, e.g. by means of a hand gesture, is possible. By arranging the transmitter(s) and receiver(s) of the channels appropriately, it is possible to implement motion-based control in a manner that is both computationally-efficient and intuitive to use.

The first algorithm may determine information about the motion of the object, but preferably determines information only about its location—for example, that the object satisfies a predetermined proximity criterion, such as one described previously. The second algorithm may determine information about the object's motion—for example, that it is moving away from the transducers of the second channel.

When combined with appropriate placement of the transducers, this approach enables the apparatus to determine useful input using relatively fast algorithms, without having to track the motion of the object using a computationally-intense approach of determining a sequence of three-dimensional coordinates by calculating the intersection of a number of quadric surfaces, and then trying to interpret these coordinates to determine whether a particular input motion has been performed.

As with other aspects of the invention, there is no need, in this method of the invention, to assume that the object acts as a point reflector, or that it has a clear front to be tracked. The apparatus can therefore be robust regarding the shape of the object used, i.e. whether the object is a hand or a finger, or some other object, and whether it changes its shape during the input. This stands in contrast to known methods based on repeatedly calculating an intersection of quadric surfaces. In such methods, specific time-of-flight estimates are computed for each transmitter-receiver pair of an apparatus. Here, by contrast, multiple reflecting surfaces on the object (or multiple taps in an estimated impulse response image) can be considered as a whole; i.e. providing one overall or average position.

Some known tracking approaches track the centroid of an input object. However, the centroid of a complex input object such as hand is difficult to identify since, as an object changes its perspective relative to the microphones or speakers of the sensing system, a changing set of surface points are visible to the system. The centroid is determined as the 'average' of the sensed points at any moment in time; however, as the object changes its orientation relative to the sensing system, this centroid must necessarily move relative to what the user intuitively understands to be the centroid of the input object. Hence, any tracking using a non-penetrating system must necessarily lead to a mismatch between the system's understanding of where the centroid or centre position of the input object is, and where the user instinctively understands the object to be. A user must therefore control the input object, such as his hand or finger, in a manner that might feel unnatural, in order to compensate for such inconsistencies. This is undesirable. However, input approaches made possible by the present invention, which are do not require detailed tracking of an object's centroid, alleviate such problems.

As mentioned, in preferred embodiments the first algorithm determines information relating to the object's location but not to its motion. This provides a particularly computationally-efficient arrangement.

The first algorithm may determine whether the object satisfies a predetermined proximity criterion, such as those described with reference to earlier aspects of the invention. In some embodiments, the first algorithm determines whether the object is within a predetermined region.

For example, the first algorithm may determine whether the total time of flight of the signal to the object and back to the apparatus is below a threshold time. When a transmitter and receiver of the first channel are spaced apart, this can facilitate determining whether the object is within an ellipsoidal region having foci at the transducers. Alternatively, when the transmitter and receiver of the first or second channels are located close to one another; for example, adjacent or touching, this can facilitate determining whether the object is within a sphere centred on the transducers. Of course, there may be other boundary conditions and constraints which place additional constraints on the shape of such a detection region in practice, such as the physical location of surfaces of the apparatus.

Advantageously, the first algorithm determines whether the object is within a predetermined elliptical radius of the transmitter. Preferably a transmitter and receiver of the first channel are spaced apart on the apparatus by more than a quarter, preferably more than a half, of a maximum dimension of the apparatus. By using such an arrangement, these transducers can be used to determine whether the object is within an ellipsoid that can be everywhere close to the apparatus; i.e. which can be long relative to the size of the apparatus without needing to protrude far away from the apparatus. In this way, it can be determined whether the object is close to the apparatus anywhere along a line across all or part of the apparatus.

The second algorithm may use information relating to signals received over the first and second channels to determine information about the motion of the object, but, at least in some embodiments, it uses only information relating to signals received over the second channel. This lessens the computational complexity needed to determine an input.

Preferably the second algorithm uses time-of-flight information relating to signals transmitted at two different times to determine motion of the object. For example, the second algorithm may compare two times-of-flight to determine if the later-received signal traveled further than the earlier-received signal; if so, it may be inferred that the object is moving away from the transducers of the second channel.

The comparison of times-of-flight may comprise comparing two values directly, but may alternatively comprise analysing a matrix of signals or impulse responses, in which responses from successive transmit signals are placed in consecutive columns or rows. By doing this the matrix can be treated in a similar way to a bitmap image and subjected to image-processing techniques. These techniques may look for motion by, for example, applying filters that look for a sloping edge to the matrix. Some such approaches are described in WO 2009/147398 by the present Applicant.

In some embodiments, the second channel is used to determine the distance of the object from an origin, independent of the bearing to the object from the apparatus (typically so long as the object remains within a region predetermined by the physical structure of the apparatus and the directional characteristics of the transducers). Since the motion information thus obtained can be represented as a single value, this can be used very effectively to control a one-dimensional input to the apparatus. It may alternatively or additionally be used to control just a binary input to the device; e.g. depending on whether the single value is rising or falling.

Such single-valued input can be used very effectively to control, say, a graphical linear slider on a display screen while avoiding any risk of cursor 'slaloming' which would typically arise when trying to control a linear input using two- or three-dimensional tracking approaches. For example, a person typically finds it difficult to effect a purely linear motion of one hand, as would be required if an input mechanism had several degrees of freedom but a linear input were desired (e.g. moving an on-screen cursor in a straight line when it is capable of being moved in two dimensions). Slaloming may also occur when using known tracking approaches, based on calculating the intersection of quadric surfaces, if there are even small errors in the time-of-flight estimates. In practice, such errors are very common, both due to limited bandwidth and to the fact that the object being tracked is never a perfect point reflector. This is especially significant when the object is not a point object, but rather, a cluster of acoustically reflecting surfaces, with no well-defined or well-definable centroid, as previously explained.

In some preferred embodiments a transmitter and receiver of the second channel are located close to each other—e.g. within 10 cm or within 5 cm of one another, or within 5% or 3% of the maximum length of the apparatus. In some other embodiments a single transducer acts as both transmitter and receiver. In these cases, the second algorithm may be able to determine whether the object is moving radially towards or away from the transducers of the second channel.

Each channel may have its own transmitter and receiver, but in some preferred embodiments, the second channel shares either a transmitter or a receiver with the first channel. Such sharing can provide a reduction in manufacturing costs. One or both channels may comprise a plurality of transmitters and/or a plurality of receivers.

In some embodiments, one of the transmitters shares an active component, such as a membrane or piezo crystal surface, with a receiver. One transducer may act both as a transmitter and a receiver, either for the same channel or for different channels. The reflection received on the second channel may arise from the acoustic signal transmitted by the transmitter of the first channel, or from a separate signal.

The first and second sets of information may comprise coordinates or any other suitable information. However, in some preferred embodiments, the information comprises binary flags indicating whether the object is, for example, within a predetermined region, or is moving away from a set of transducers. These information sets may be stored in a computer memory, such as RAM or CPU registers.

The determination of an input to the apparatus makes use of the first and second sets of information. The placement of the transducers on the apparatus, and the type of input to be determined, will affect exactly how the information sets are used to determine the input. In one example, an input consists of a sweeping gesture of an object, typically the user's hand, from left to right across a horizontally-elongate zone in front of the device. This may be used to interact with a virtual volume slider displayed on the screen of a television set, for example. It is desirable that a determination of the input is made only when the user's hand is close to the displayed slider, since there may be other interactive elements displayed elsewhere on the screen and so as to avoid false detection of other movements occurring elsewhere in the room. A transmitter is preferably located on the appliance. This transmitter may be shared by both channels.

In one specific example, it will be assumed (merely for the purpose of the example) that the transmitter is near the left end of a device apparatus. A receiver for the first channel may be located near to or adjacent the right end of the zone, while a receiver for the second channel may be located near the transmitter at the left end—e.g. within 5 cm. By applying a time-of-flight threshold to signal reflections received over the first channel, the device can determine when an object enters an elongate ellipsoid (truncated by the front face of the device) of approximately the same length as the zone on the face of the device, and projecting only a relatively small amount from the face of the device. Thus the first set of information may comprise a flag as to whether an object is close to the slider or not. Two or more consecutive time-of-flight measurements of reflections using the second channel may be made either at the same time or after a positive determination is made in respect of the first channel. These may then be inspected in order to determine whether an object is moving towards or away from the transmitter and receiver of the first channel. Since it is known that the object is, at least initially, close to the slider zone, this would imply motion of the object from left to right across the zone or vice versa. This assumes that the same object is being detected in both channels, which may be a reasonable assumption to make; or, in some embodiments, this may be verified using additional information and/or analysis, such as considering reflections from other transducers, or performing a more detailed analysis of the pattern of reflected signals in both channels.

It may also be advantageous to keep checking periodically that the object is within the region determined using the first channel while the motion information is captured using the second channel, in order to detect if the user's hand moves too far away from the slider zone and react appropriately.

If it is determined that the user's hand is close to the slider and that it is moving from away from the transmitter; i.e. that it is moving from left to right, the volume of say a television set may be increased and a graphical element representing the volume level may be moved in synchronisation with motion of the hand. When the movement of the hand stops, or it leaves the zone (as detected by the first channel), the volume level is set at the corresponding position.

Apparatus according to the aspect of the invention set out above may have any number of different channels, each with an associated algorithm. Some channels may use the same algorithms as each other, or every channel may have a unique algorithm associated with it. Some channels may be capable of providing input into more than one algorithm, either running concurrently or at different times. The association of transducers (transmitters and receivers) with channels may be fixed or may change over time; for example, it may be changed dynamically depending on the type of input to be determined.

In some embodiments, channels are combined in different modes to obtain a particular advantage. Preferably at least one channel is used in 'proximity' mode, and at least another in 'radial' mode; however, other modes may be combined, such as array modes. For instance, the apparatus could comprise two closely-spaced, or adjacent receivers and processing means arranged to process signals received from these receivers as an array. It is thereby possible to provide increased directional sensitivity. Closely-spaced may here mean closer than the wavelength, or half the wavelength, of the highest or lowest frequency emitted by the transmitter; however, it could be greater than this (e.g. in accordance with the definition set out above).

The apparatus may be arranged to determine a single input type at a time, but is preferably arranged to identify an input from a set of two or more possible inputs. These may, for example, be gestures differing in style and/or gestures differing in position relative to the apparatus. They could, for example comprise the same gesture performed in reverse.

In some embodiments, the apparatus supports a plurality of applications (e.g. software applications, such as a music player, picture viewer etc.) or interaction modes. One or more of these may temporarily be designated an active application or interaction mode. The apparatus may be configured to receive an input by identifying a gesture from amongst a finite set of gestures, wherein the composition of the set of gestures depends on which application or interaction mode is active; e.g. which application is set to receive the input. The set of gestures, referred to hereinafter as the "active gesture set", will therefore be subset of all the gestures which the apparatus is capable of recognising. For example, an active gesture set may be chosen depending on which application has been selected by a user or by the apparatus to receive input, or on which application is running in the foreground, or on which application is controlling the majority of a display surface.

The idea of application-specific gesture sets is new and inventive in its own right, and thus from a further aspect the invention provides a method of receiving an input from a moving input object, comprising:
  determining that one of a plurality of applications or interaction modes is active;
  selecting, in dependence on the active application or interaction mode, an active gesture set comprising a subset of a larger set of predetermined gestures;
  receiving a signal conveying information relating to movement of the input object; and
  processing the received signal to identify a gesture from the active gesture set and thereby determine said input.

This aspect extends to apparatus for receiving an input from a moving input object, comprising:
  receiving means arranged to receive a signal conveying information relating to movement of the input object; and
  processing means configured to:
    determine that one of a plurality of applications or interaction modes is active;
    select, in dependence on the active application or interaction mode, an active gesture set comprising a subset of a larger set of predetermined gestures; and
    process the received signal to identify a gesture from the active gesture set and thereby determine said input.

This aspect further extends to a computer software product, and a carrier bearing the same, which, when executed on processing means, causes the processing means to:
  determine that one of a plurality of applications or interaction modes is active;
  select, in dependence on the active application or interaction mode, an active gesture set comprising a subset of a larger set of predetermined gestures; and
  process the received signal to identify a gesture from the active gesture set and thereby determine said input.

By restricting the set of recognisable gestures depending on the active application (e.g. a photo viewer application) or interaction mode (e.g. a slide presentation mode, or a movie-viewing mode), it is possible to support intuitive gestures that are appropriate for a particular application or mode, while at the same time increasing the system's detection rate for a particular gesture. In some embodiments, the system attempts to find the best match between any input movements of the input object and the selected gesture set.

By contrast, if only a single, common, gesture set were to be provided, it would have to be shared across all applications. To minimise gesture-misclassification errors, the set would have to contain only a relatively small set of gestures. This would potentially result in the same gesture being used for different functions in different applications, which could be confusing to the user. Furthermore, a limited set of gestures cannot typically support gestures that are tailored to specific applications. If a larger, single gesture set were provided, to support a richer range of gestures, it would then suffer increased misclassification rates, because it is harder for the system to distinguish between gestures that would need to be more alike. It could also lead to user frustration because, for at least some applications, there will be redundant gestures which do not perform any function for that application.

An application or interaction mode may have been activated by a human user, for example, by clicking an icon, or by the apparatus, for example, an alarm clock application may become active when a predetermined time is reached. A default application or interaction mode may be activated automatically under certain conditions, such as when the device is first powered on. Preferably, the identified gesture is used to control a function of the active application or a function of the apparatus defined by the active interaction mode.

The input object may be a stylus, a fingertip, a hand, or any other suitable object. The gestures may be of any suitable type. An example gesture might be the input object being swept from left to right past a front face (e.g. a display panel)

of the apparatus. The gesture would not typically require contact between the input object and the apparatus (i.e. it is a touchless gesture), although contact is not excluded.

Another example of a gesture is the input object being moved directly towards the apparatus, being stopped short of contacting the apparatus, and being held static in the stopped position for a predetermined time. This might be affected by a user pushing the palm of his hand in line towards a display screen, and holding it a distance away from the screen, much like a "stop" hand signal. This gesture could be used, for example, with a slide-show application to prevent an automatic transition from one slide to the next. The current slide may be paused for as long as the user maintains his hand in the stationary position, with the slide show recommencing once his hand is removed.

Another possible gesture is a motion of the object along a path directly towards a part of the apparatus, then immediately away again along approximately the same path, in a "tapping" motion. This gesture might be used to select an icon on a display screen.

Further possible gestures include up, down, left or right sweeping movements, e.g. past a display surface.

Such gesture may be tested for, or identified, by any suitable means. Optical, acoustic, radio-frequency, or any other appropriate mechanism might be used. In some embodiments, method steps described elsewhere in this specification could be employed to identify a gesture.

It will be appreciated that, for the recognition of certain inputs, the placement of the transducers relative to one another and to the apparatus can be important. For example, when the apparatus comprises a display screen or other interaction surface, the transducers may be located adjacent the screen or surface in specific ways to support particular graphical user-interface elements.

In one aspect, the invention provides apparatus for receiving input from a moving object, comprising a first acoustic transmitter, a first acoustic receiver, a third acoustic transducer, and processing means, the apparatus being arranged to:
   transmit at least one acoustic signal from said transmitter;
   receive at least two acoustic reflections off the object; and
   process the received signals so as to determine an input due to the motion of the object,
wherein the distance separating said transmitter and said third transducer is at least twice the distance separating said transmitter and said receiver.

The third acoustic transducer may be a transmitter or a receiver. A first channel may be defined comprising the third transducer and the first transmitter or receiver. Due to the relatively large separation of the elements of this first channel, it is well suited to determining the presence of an object in an ellipsoid region, as described previously, although the region may have another shape. A second channel may be defined comprising the first transmitter and receiver. Their relatively small separation facilitates determining movement away from or towards the transmitter and receiver, largely independent of the direction of such movement (since a given time-of-flight will define an approximately spherical surface).

This arrangement of transducers, which facilitates the defining of a relatively elongate ellipsoidal region and also a relatively spherical region, has been found to give particularly advantageous performance when it is desired to receive approximately linear input movements. The computational requirements to determine the presence of an object inside an ellipse, and to determine radial movement away from or towards an origin, are relatively low compared with three-dimensional tracking requiring the real-time calculation of intersections of multiple quadric surfaces. This provides substantial advantages in terms of reliability and cost of manufacture. As previously mentioned, methods of the invention may also be more robust when complex shapes, such as a human hand, are used as the input object, since they do not need to try to resolve the precise coordinates of a centroid of the object.

Preferably the separation distance between the first transmitter and the third transducer is at least ten times the distance separating the first transmitter and the first receiver. Preferably the first transmitter and the first receiver are adjacent or touching (as defined hereinabove). They may in some embodiments share some components or be the same physical transducer.

Preferably the three transducers define an input zone with the first transmitter and first receiver at one edge or face of the zone and the third transducer at an opposite edge or face, with the zone lying between these edges or faces. The processing means may then be configured to receive inputs at least or only when the object is moving within the input zone.

In all the above aspects, the transmitted signal may be audible but is preferably ultrasonic; e.g. having frequencies greater than 20 kHz, especially greater than 30 kHz. In some embodiments the frequency might be in the range 35-45 kHz. In other embodiments a higher frequency than this could be used. Thus in one set of embodiments the frequency is greater than 50 Hz or even greater than 100 kHz—e.g. between 100 and 200 kHz. The transmitters could be controlled to transmit continuous signals or discrete impulses. The signal may comprise a single frequency, or may comprise a plurality of frequencies. It may be of any suitable type; for example, a pulse, a chirp, a train of pulses, a succession of chirps; and may be discrete or continuous or continual.

Various features have been described with reference to one of more different aspects of the invention. These features are not limited only to those aspects, but, where appropriate, may also be features of any of the other aspects. Wherever a method according to the invention is described herein, it should be understood that the invention extends to suitable apparatus configured to implement the method, and to a software product, and a carrier bearing the same, which, when run on data processing means, causes the processing means to carry out steps of the method.

DETAILED DESCRIPTION OF CERTAIN INVENTIVE EMBODIMENTS

Certain embodiments of the invention will now be described, by way of example only, with reference to the accompanying drawings.

Figure 1:
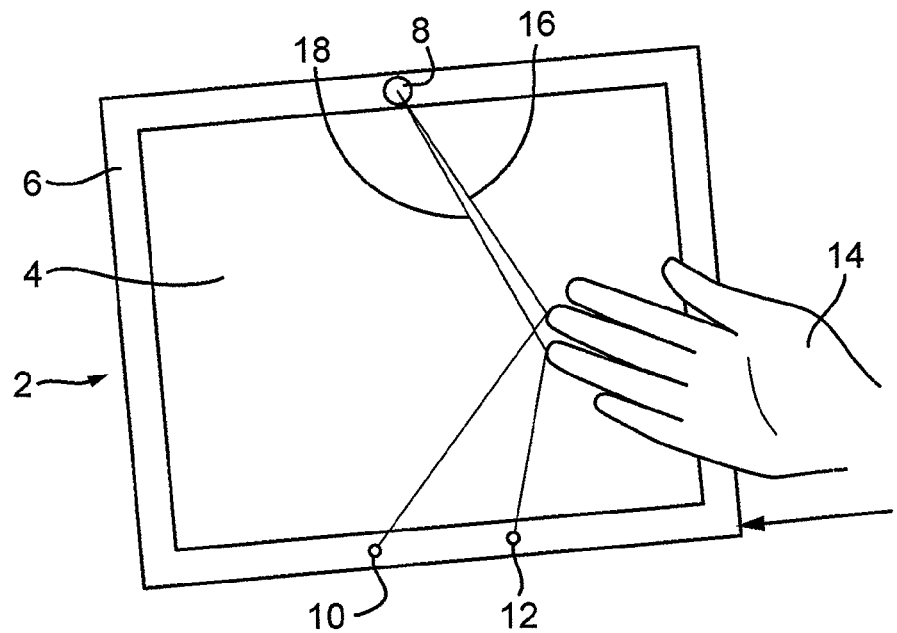
FIG. 1 is a perspective drawing of a gesture-responsive display unit according to one aspect of the invention.

FIG. 1 shows a gesture-responsive display unit 2 having a stand to the rear (not visible) which keeps it fixed at a slight incline to the vertical. It comprises a flat-panel LCD screen 4, suitable for showing digital photographs, mounted in a frame 6. The top horizontal portion of the frame has, centrally flush-mounted therein, an ultrasound transmitter 8. The bottom horizontal portion of the frame has, flush-mounted therein, a left ultrasound receiver 10 and a right ultrasound receiver 12, located respectively to the left and right of centre.

In use the transmitter 8 is arranged to transmit ultrasonic pulses at periodic intervals (e.g. every $1/100$ seconds). The pulses might all be the same, or could, for example, alternate between a higher and a lower frequency. Each pulse lasts for example 10 micro-seconds. The left and right receivers 10, 12 each receive the signals. An inbuilt processor and associated circuitry coordinates the timing of the transmit signals, and also decodes the received signals and stores them in a memory buffer to allow subsequent analysis for determining the time at which signals were received.

As will be explained in more detail below, the display unit 2 is arranged to be responsive to a gesture of a human hand 14 passing in front of the LCD screen 4, e.g. from right to left, with the nearest part of the hand to the screen (typically the fingertips) being at a range of approximately 1 cm to 20 cm from the surface of the screen. In particular, it is arranged to respond to the gesture be moving from displaying one photograph to the next, from an ordered album of photographs. A visual animation of the new photograph sliding in from the side over the top of the preceding photograph can be used to enhance the user experience.

The detection of this gesture is accomplished through analysis of the signals received after reflection from the hand 14. In particular, depending on the position of the hand 14, a transmitted signal follows two separate paths 16, 18 to the hand and away from it again after reflection to the left receiver 10 and right receiver 12 respectively. It may be observed in the diagrams that the reflections are shown as coming from two different fingers. This illustrates an advantage inherent in at least preferred embodiments of the invention whereby it is not necessary to track the movement of a specific part of the object—e.g. a specific finger tip. The ability to avoid having to 'focus' on a particular part of the hand makes the system more reliable and less complex than known single-range measurement systems such as a finger-tip based ultrasonic tracking system or a general infra-red tracking system.

The details are explained with reference to FIG. 2, which shows an approximate plan view of the display unit 2 of FIG. 1. Although not in fact be visible from above, the positions of the transmitter 8 and receivers 10, 12 have been shown for convenience. Four successive positions of the hand 14 in its journey from right to left in front of the display unit 4 are illustrated 14a, 14b, 14c, 14d.

Each periodic transmit signals is received at the receivers 10, 12 along a direct path from the transmitter 8 to the receiver. However since the geometry of the transducers is fixed, this is easily predicted and can be disregarded. Reflections or echoes of the signal from objects situated in front of the screen will typically follow shortly after the direct path.

The total time of flight from the transmitter 8, via an object creating an echo, to a receiver 10, 12 conveys information concerning the position of the object in three dimensional space relative to the unit 4. In particular, receipt of an echo within a certain time determines that at least a part of the object giving rise to that echo is situated within an ellipsoid, having the receive and transmitter as foci, where the size of the ellipsoid is a function of the time. The fact that an echo must be sufficiently strong to be able to detect means that any recorded time of flight will also depend the object's reflectiveness to ultrasound, which will be influenced by the object's size, shape and composition.

In order to detect movement of the hand 14 from right to left, it is sufficient in the present embodiment to determine that the hand is located at a first position 14b in front and to the right of the screen at a first point in time, and is located at a second position 14c in front and central or to the left of the screen at a second point in time. To ensure that a gesture is detected only when performed at a minimum speed, a maximum allowed time threshold is set between the first and second points in time in order for the gesture to be registered.

Virtual left and right proximity zones 24, 26 can be imagined in respect of the left 10 and right 12 receivers respectively. These are defined by a maximum time-of-flight threshold in which an echo can be detected after transmission of a tone from the transmitter 8. In order to ensure that an echo originates from the user's hand 14, and not from some smaller object, such as an insect flying in front of the screen, a minimum energy threshold is set for the received signal in order to register a qualifying echo.

Considering the right receiver 12 first: after a signal is sent from the transmitter 8, a direct signal will be received at the right receiver 12. The direct-path signal is of no interest and is ignored or removed with a suitable filtering or subtraction scheme. Immediately after the direct-path signal has been received, a sliding time window is opened to listen for echoes. A rolling sum of the energy received during the time window is calculated, and when this exceeds a predetermined threshold, a hand detection event is registered. The sliding window is only kept open for a predetermined length of time, corresponding to a predetermined proximity criterion or the size of the aforementioned ellipsoid. After this time, if no echo is registered for that transmit signal, no received signals are recorded until the next signal is transmitted from the transmitter 8, at which point the process repeats.

The same process occurs in respect of the left receiver 10.

If a detection event is recorded in respect of either channel 8, 10 or 8, 12, further analysis is carried out to determine which occurred first, and whether a detection event was recorded in respect of the other channel resulting from a subsequently transmitted signal.

If a hand detection event is first recorded for the right channel 8,12 (e.g. when the hand is at location 14b) and another hand detection event was subsequently detected by the left channel 8,10 (e.g. when the hand is at location 14c or 14d), as the result of an echo from a subsequent signal, within a predetermined time after the right-receiver detection event, an identification of a right-to-left gesture is made and the screen 4 is updated accordingly.

A left-to-right gesture may be identified if the order of detection events is reversed (i.e. the left channel 8,10 detects first, followed by the right channel 8,12).

In order to reduce the risk of false detections, a time period may be provided after a gesture has been successfully identified before the system is ready to identify a further gesture.

Figure 2:
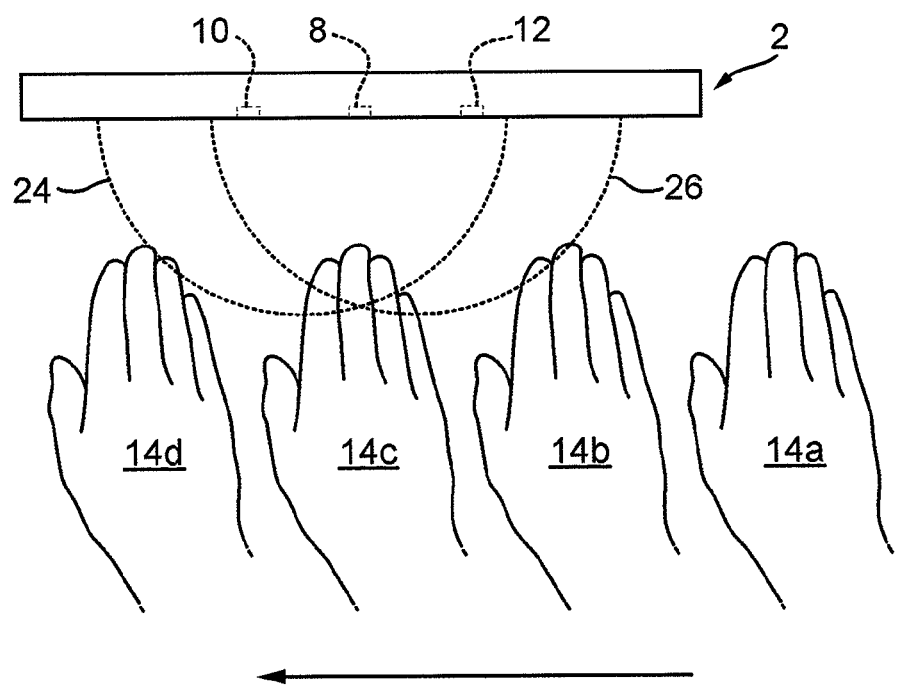
FIG. 2 is a figurative plan view of the display unit showing progressive movement of a hand past the unit.

Considering the scenario of FIG. 2, the hand 14 is initially at a position 14a out of detection range of either transmitter-receiver pair. As the hand starts to move in front of the right side of the display unit 2, it reaches a position 14b where enough of the hand (e.g. two fingertips) are within the detection zone 26 of the right channel 8,12 that a signal transmitted from the transmitter 8 is reflected from the hand 14 with sufficient energy that the right receiver 12 receives, within the sliding time window, energy exceeding the predetermined threshold. It therefore registers a first hand detection event.

As the hand 14 continues moving leftward, it reaches a position 14c where it is sufficiently-far within the detection zone 24 of the left channel 8,10 that a transmit signal (subsequent to the tone that was responsible for the first detection event) reflects off the hand with sufficient energy that a second detection event is recorded for the left receiver 10. Since this second event occurred after the first event, but still within the predetermined reset time period, a right-to-left gesture is flagged as having occurred and a signal is sent to the appropriate local or remote processing system for a suitable response to the gesture to be effected, such as changing the display 4 to show the next photograph in the album.

Although, for clarity, the operation of the device has been described as if the processing happens in "real time", in fact, the signals received from the receivers 10, 12 are typically stored in a temporary storage medium such as RAM and then processed slower than real time. In particular, because hand detection events for successive transmitter-receiver pairs may occur in too rapid succession for real-time processing to reliably register both, if a hand detection event occurs for one channel, further processing of the signals for that channel may be halted and an analysis of the stored received signals for the other channel commenced in order to check, retrospectively, whether a subsequent hand detection event occurred in respect of that channel also.

In order to provide better resistance from background noise, instead of flat pulses being transmitted, chirped signals may be used. In one embodiment each signal comprises a rising tone followed immediately by a falling tone. The received signals are then subject to a de-chirp operation, corresponding to the shape of the transmitted chirp; in this way background noise can be effectively filtered out. However this requires more sophisticated signal processing which may not be available on some devices or may be too power-hungry.

Figure 3:
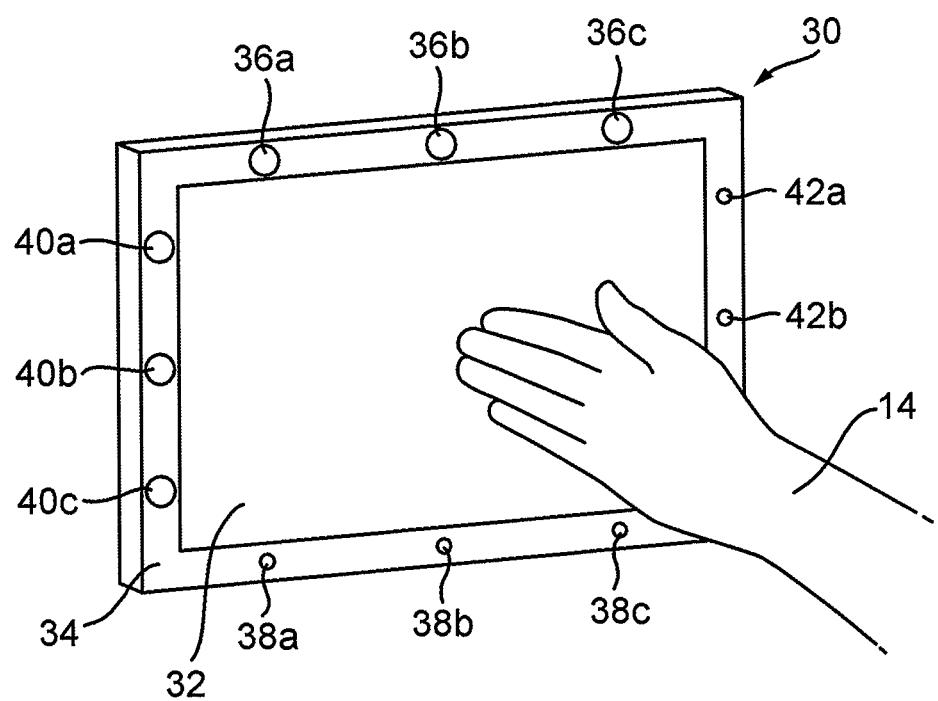
FIG. 3 is a perspective drawing of a different gesture-responsive display unit embodying the invention.

FIG. 3 shows a second embodiments of a display unit 30 having an LCD screen 32 and a border 34. It operates in a somewhat similar fashion to the previous embodiment, but instead of having only one transmitter 8 and two receivers 10, 12, the display unit 30 has three transmitters 36a, 36b, 36c horizontally spaced along the top of the frame 34; three receivers 38a, 38b, 38c horizontally spaced along the bottom of the frame 34; three transmitters 40a, 40b, 40c vertically spaced down the left side of the frame 34; and three receivers 42a, 42b, 42c (obscured) vertically spaced down the right side of the frame 34. Each transmitter cooperates with its opposite neighbour, located horizontally or vertically across the screen 32 from it, to form a channel. In this way, six different detection zones may be defined. These may overlap with each other, as in the previous embodiment, but could be arranged to be distinct, by setting the upper bound on the maximum time-of-flight for each pair to be sufficiently low (this was not possible in the previous embodiment because the transmitter 8 served two transmitter-receiver pairs, and was therefore a focus for two different ellipsoids which must necessarily therefore have some overlap).

Having three horizontal detection zones and three vertical detection zones, each spanning the full width of the screen 32, effectively enables a 3×3 grid of nine regions to be established over the surface of the screen 32. In this way, more complex gestures such as circling movements or diagonal sweeps can be identified, based on the order in which detection events are recorded for the various transmitter-receiver pairs.

If some of the transmitters and receivers are reused for multiple channels, even more complex detection zones may be established.

Figure 4A:
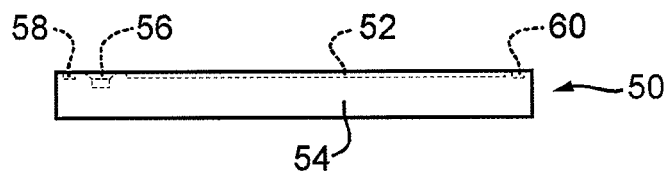
FIG. 4a is a schematic horizontal cross-section through a device in accordance with a different aspect of the invention.
Figure 4B:
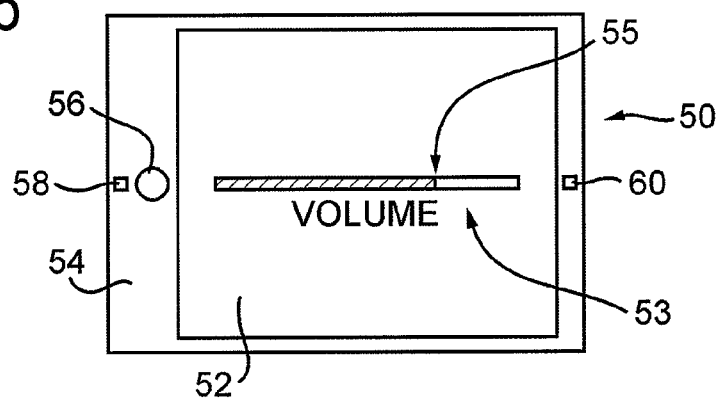
FIG. 4b is a schematic front view of the same device.

FIGS. 4a and 4b show different views of a device 50 in accordance with another aspect of the invention. The device 50, which may be a television screen, computer monitor, portable music player, mobile phone, or the like, has a display screen 52 surrounded by a frame 54. The screen 52 is displaying a graphical volume slider 53. A mark 55 on the slider corresponds to the current volume level for audible sound emitted from the device 50.

Mounted in the frame 54 to the left of the screen 52 are an ultrasound transmitter 56 and a left ultrasound receiver 58. To the right of the screen 52 is a right ultrasound receiver 60.

Figure 5:
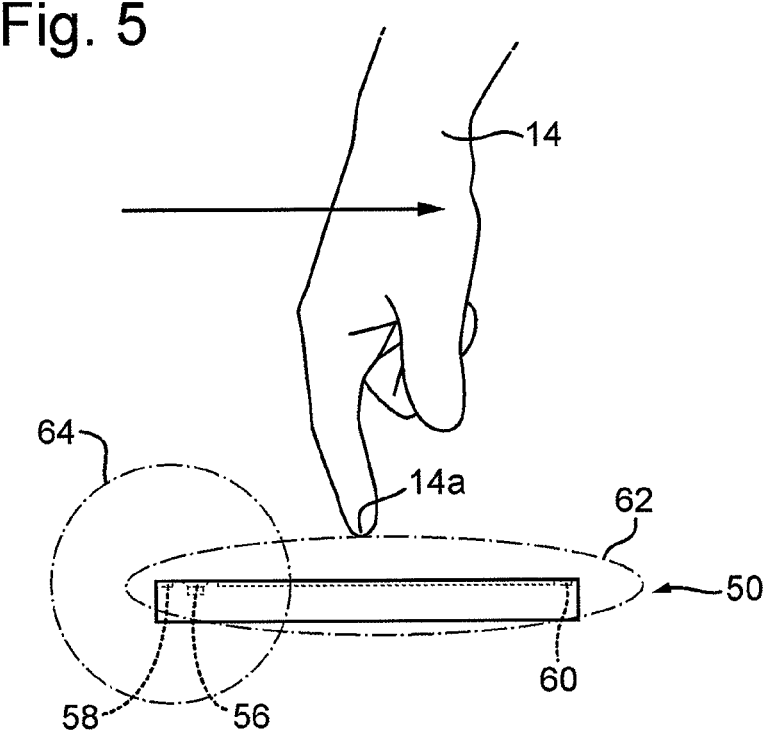
FIG. 5 is a figurative plan view of an interaction with the device.

FIG. 5 shows use of the device 50 by a user to increase the volume. A continuous or periodic acoustic signal is transmitted from the transmitter 56. This may be a pulse or tone, or preferably a chirp. Electronic circuitry connected to the right receiver 60 monitors the received signals to identify reflections of the signal received by the right receiver 60 within a maximum time-of-flight bound. It may be accomplished using any appropriate technique; for example, by opening a time window immediately after transmission of a signal by the transmitter 56, applying a de-chirp operation to received signals, filtering out a direct-path signal from the transmitter 56 to the receiver 60, integrating received energy in the de-chirped signal over a sliding time sub-window, determining if greater than a threshold energy is received at any point during the sub-window, and closing the main time window when the maximum time-of-flight bound elapses. Other methods are possible; however this has the advantage of requiring relatively little computational processing effort.

The acoustic signal preferably repeats over a time frame somewhat longer than the time taken for sound to travel twice the width of the device 50.

The maximum time-of-flight boundary effectively defines an ellipsoid region 62. If a suitably reflective object enters this region 62, the device 50 will detect this.

The graphical slider may be permanently displayed on the screen, but it preferably appears at this point; i.e. when the user's fingertip 14a is detected near the relevant part of the screen 52.

Also at this point, electronic circuitry connected to the left receiver 58 starts monitoring the received signals to identify reflections received by the left receiver 58. By any appropriate means, it determines whether successive reflections from the user's fingertip 14a are progressively taking longer to arrive or less time to arrive. This may be accomplished by recording a series of time-of-flight measurements, a measurement being recorded whenever the received energy from a reflected signals exceeds a threshold within a sliding time sub-window, as above. By comparing adjacent measurements, or by analysing a trend across several measurements, the circuitry can determine whether the fingertip 14a is moving radially towards or outwards from the left side of the frame 54 in an approximately spherical manner. An example spherical region 64 is shown in FIG. 5.

Alternatively, this radial channel may compute an approximate position of the hand 14 or fingertip 14a, which could be derived as an average position of multiple reflective points, or as multiple 'taps' in an impulse response. Advantageously this can mean that the user does not necessarily have to extend his/her finger in order to control the volume slider 53. Instead, multiple fingers, a fist, or a scooping hand could be used, which can provide a more natural feel to the user.

By itself, i.e. not in conjunction with the ellipsoid channel, this radial position would only give radial information, i.e. it could not point to where in space the finger is, just how far away it is. In conjunction with the first channel, however, the device 50 can calculate how far away within the proximity zone it is, which translates to becoming the x-position along the surface and between the elements.

While this motion determination is being made, the circuitry connected to the right receiver 60 continues to determine whether the user's fingertip 14*a* remains within the ellipsoid region 14*a*, close to the graphical slider 53.

As the user moves his hand 14 in the direction indicated by the arrow in FIG. 5, the control circuitry driving the display screen 52 moves the mark 55 on the slider 53 progressively rightwards, and the volume of any audible sound being output from the device 50 is also increased.

The device 50 may be configured to identify crudely any substantially-large left-to-right sweep as an input to the device. This may be accomplished by comparing just two time-of-flight measurements from the left receiver 58. The device 50 may then increase the volume by a fixed increment, with a number of repeated sweeps being required to increase the volume by a large amount.

Alternatively, the device 50 may monitor the movement of the fingertip 14*a* in greater detail, for example by considering several successive time-of-flight measurements from the left receiver 58. It may then be possible to set the volume by moving the fingertip 14*a* from left to right and stopping the movement around the desired position for the mark 55 on the slider 53. The device 50 may fix the volume level when cessation of movement of the fingertip 14*a* from left to right is detected, or when the fingertip 14*a* is removed from the ellipsoid region 62 (e.g. along a path roughly perpendicular to the face of the display screen 52).

A right-to-left movement or series of movements may be detected similarly by determining an approaching motion of the fingertip 14*a* towards the transmitter 56.

Figure 6:
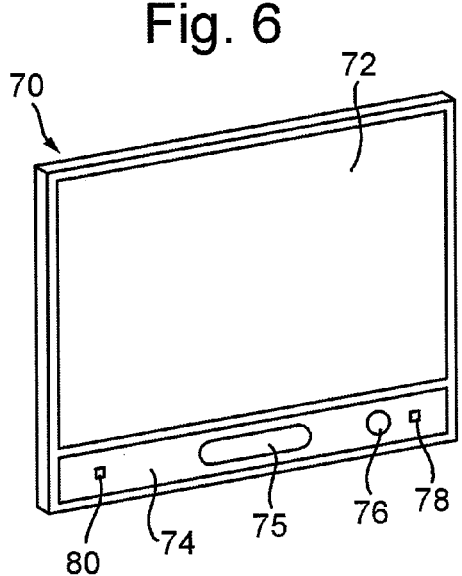
FIG. 6 is a perspective view of the front of a television set embodying the invention.

FIG. 6 shows an embodiment in the form of a television set 70. Beneath the screen 72, it has a loudspeaker panel 74, containing one or more loudspeakers 75 behind a mesh grille or fabric cover (not shown). These loudspeakers 75 are used conventionally for reproducing audible sound. This same panel region 74 can advantageously also be used as a sensing zone. This allows the transducers for the input mechanism to be hidden from view behind the same mesh as protects the speaker elements 75. Using this region 74 as a zone for gesture-based inputs also allows such inputs to be made without obscuring the screen 72, which may be desirable in certain situations.

In the loudspeaker panel 74 there is an ultrasound transmitter 76 situated near the right edge of the television set 70; a first ultrasound receiver 78, situated close to the transmitter 76 in order to form a first, 'radial' channel; and a second ultrasound receiver 80, situated relatively far from the transmitter 76 near the left edge of the set 70 in order to form a second, elongate or 'ellipsoid' channel, substantially spanning the width of the television set 70. These can be operated to provide a volume input as already described. Alternatively or additionally, they may facilitate other inputs, such as channel up and down.

Figure 7:
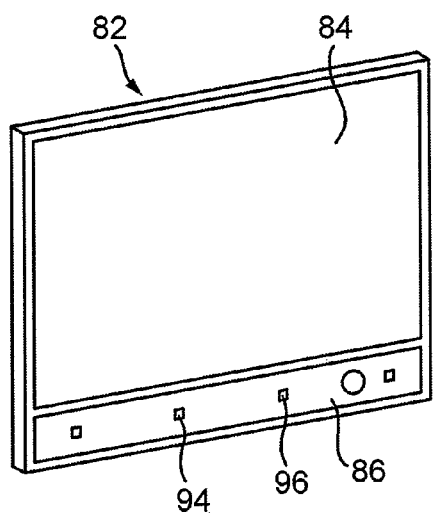
FIG. 7 is a perspective view of the front of a different television set embodying the invention.

The television set 82 of FIG. 7 is very similar to that of FIG. 6, except for the addition of two further acoustic receivers 94, 96 situated more centrally in the loudspeaker panel 86. This increase in the number of receiving elements enables additional 'radial' channels and 'ellipsoid' or 'proximity' channels to be established and used in combination, or interchangeably, to increase the precision or the reliability of the system.

Figure 8:
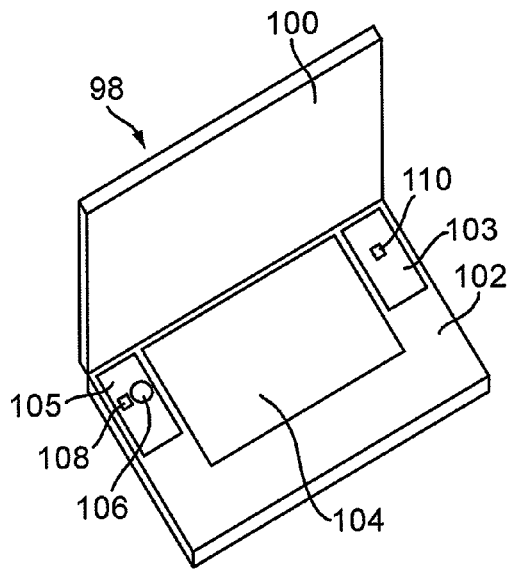
FIG. 8 is a perspective view looking down on a laptop embodying the invention.

FIG. 8 shows a laptop 98 comprising a display panel 100 connected by a hinge to a base panel 102 comprising a keyboard 104. It has a right speaker panel 103 to the right of the keyboard 104 and a left speaker panel 105 to the left of the keyboard 104. These house conventional audio speakers (not shown) for outputting stereo sound. An ultrasound transmitting element 106 and a left receiving element 108 are embedded in the left speaker panel 105. A right receiving element 110 is embedded in the right speak panel 103. In this way, an x-positioning zone can be created across and above the keyboard surface 104; i.e. by appropriate operation of the ultrasound transducers, movements having a linear component from one side of the keyboard 104 towards the other side can be detected.

Figure 9:
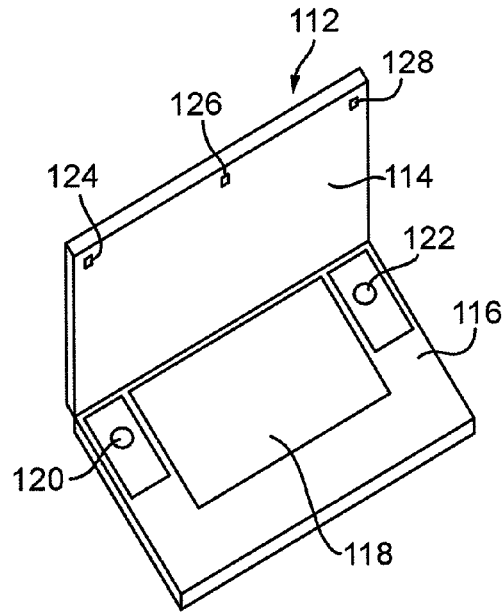
FIG. 9 is a perspective view looking down on a different laptop in accordance with another aspect of the invention.

FIG. 9 shows a laptop 112 outwardly similar to the laptop of FIG. 8, but operating in a manner more closely related to the gesture-responsive display unit 2 of FIG. 1. It has a left ultrasound transmitter 120 and a right ultrasound transmitter 122 mounted on a base panel 116, one on either side of the keyboard 118. The display panel 114 has, mounted along its upper edge, three ultrasound receivers; a left receiver 124 near the top left corner, a central receiver 126 near the middle of the upper edge, and a right receiver 128 near the top right corner.

In use, the left transmitter 120 may cooperate with right and central receivers 124, 126 to define two virtual proximity zones as described above with reference to FIG. 2. The right transmitter 122 may cooperate with central and right receivers 126, 128 to define a further two virtual proximity zones. Other combinations are possible instead or additionally. Side-to-side hand motions across the face of the display screen 114 may thus be detected using methods of the invention already described.

The ultrasound transmitters 120, 122 and ultrasound receivers 124, 126, 128 are thus located on different panels 116, 114 of the laptop, connected by a hinge. In normal use, when the laptop 112 is open, these panels will be very approximately at right angles to one another. The is advantageous in that the transmitters 120, 122 are physically angled towards the receivers 124, 126, 128 across the face of the display panel 114. This enables the use of directional transmitters for recognising a movement of an object in the vicinity of the display panel 114, rather than needing omnidirectional transmitters as might be the case for transmitters and receivers mounted on a common panel. Directional ultrasound transmitter are typically cheaper than omnidirectional transmitters and can be driven with less power for the same level of received energy at the receivers 124, 126, 128 along reflected paths close to the screen 114.

Having the ultrasound transmitters 120, 122 mounted on the base panel 116 is also advantageous in that they can be hidden under the kind of mesh often used to hide audio speaker elements in existing laptop designs, as is the case also for the laptop 98 shown in FIG. 8.

Figure 10:
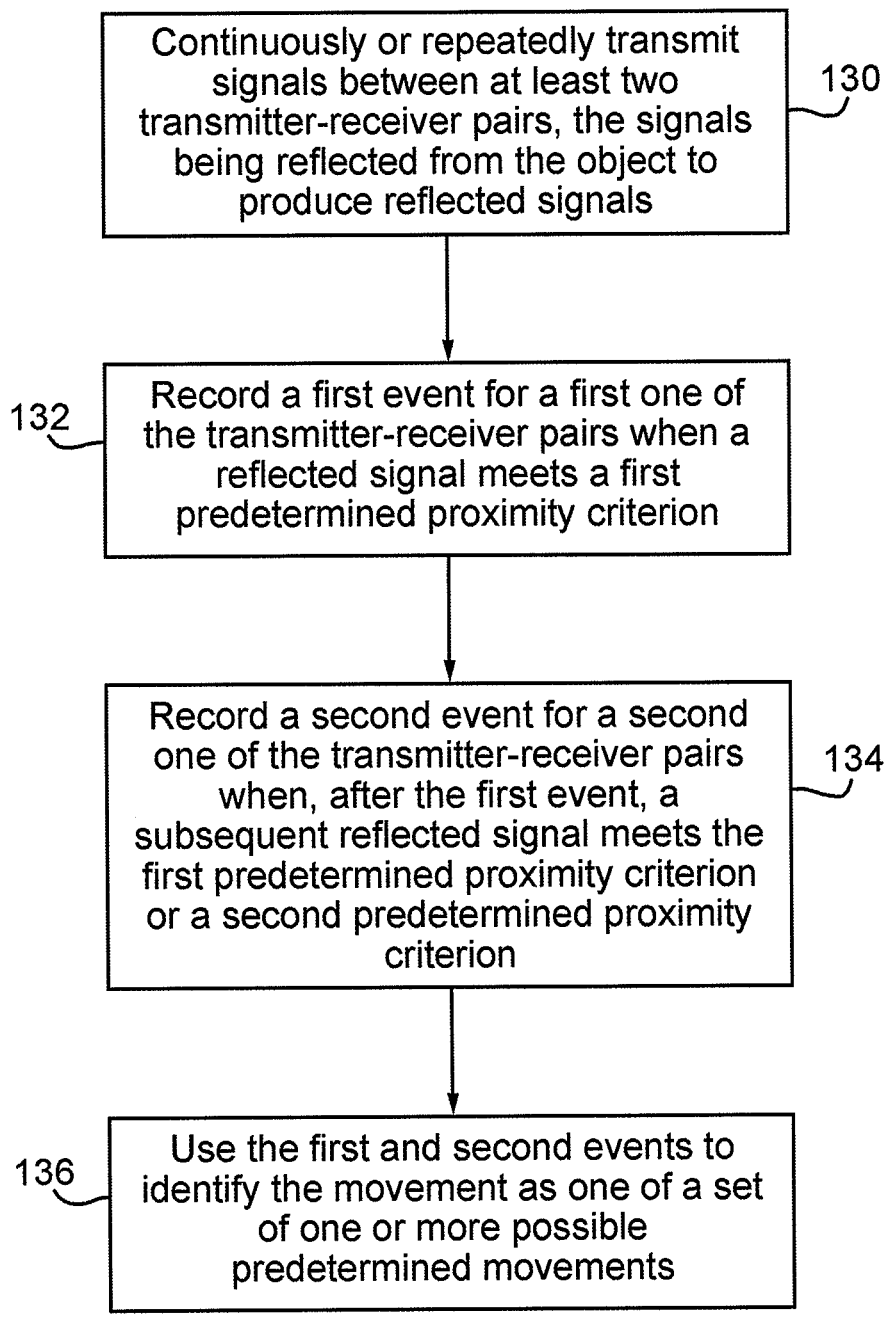
FIG. 10 is a flow chart of a method according to the invention.

FIG. 10 illustrates a method of recognizing a movement of an object as one of a set of one or more possible predetermined movements, comprising a step 130 of continuously or repeatedly transmitting signals between at least two transmitter-receiver pairs, the signals being reflected from the object to produce reflected signals; a step 132 of recording a first event for a first one of the transmitter-receiver pairs when a reflected signal meets a first predetermined proximity criterion; a step 134 of recording a second event for a second one of the transmitter-receiver pairs when, after the first event, a subsequent reflected signal meets the first predetermined proximity criterion or a second predetermined proximity criterion; and a step 136 of using the first and second events to identify the movement as one or more of the predetermined movements.

Figure 11:
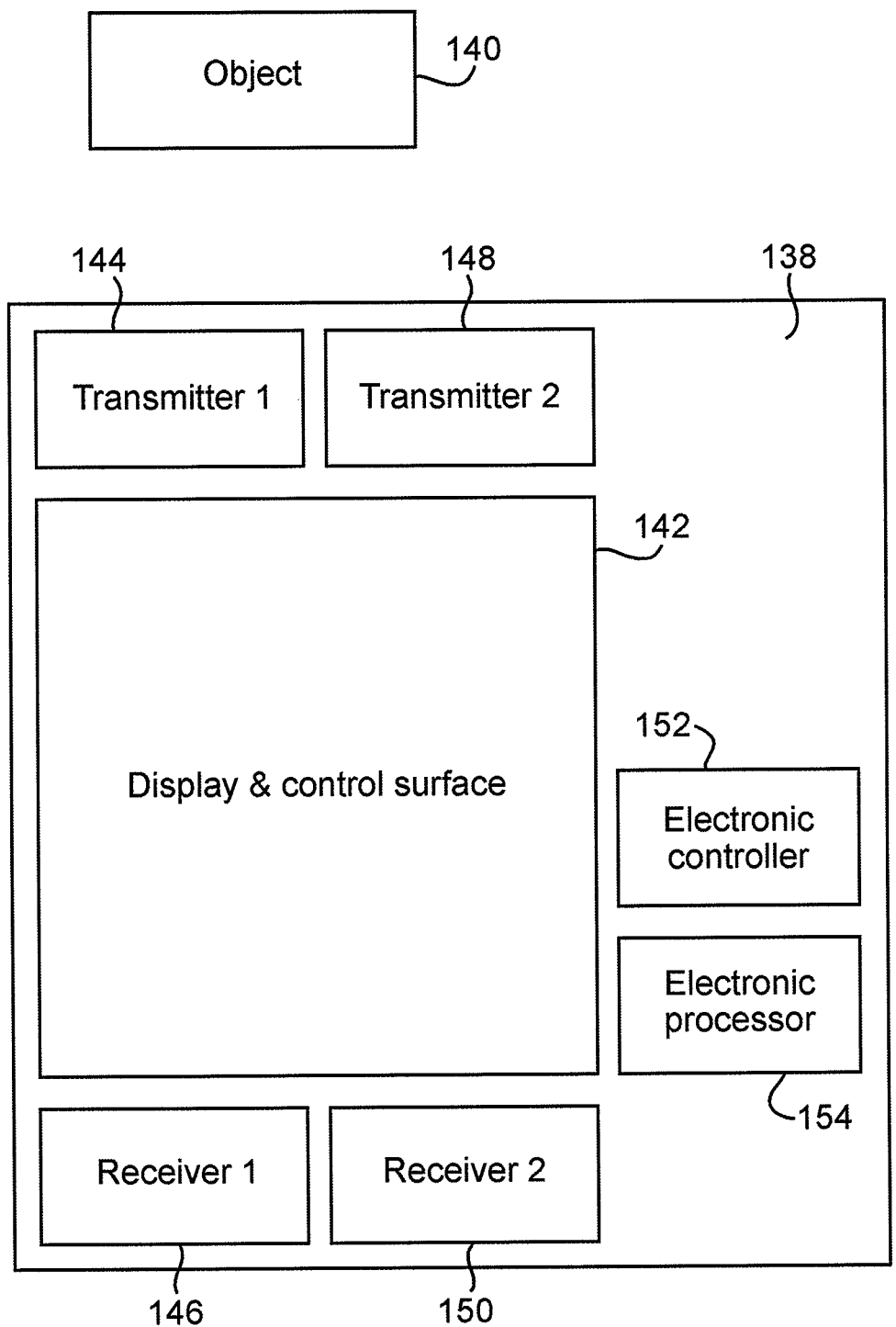
FIG. 11 is a schematic diagram showing an apparatus embodying the invention.

FIG. 11 shows an apparatus 138 for recognizing a movement of an object. It comprises a display 142, similar to displays, such as display 4, described elsewhere herein. The apparatus 138 comprises two transmitter-receiver pairs. The first pair comprises a first transmitter 144 and a first receiver 146. The second pair comprises a first transmitter 148 and a first receiver 150. The apparatus 138 also comprises an electronic controller 152 arranged to: continuously or repeatedly transmit signals between the at least two transmitter-receiver pairs, the signals being reflected from said object to produce reflected signals; record a first event for a first one of said transmitter-receiver pairs when the reflected signal meets a first predetermined proximity criterion; and record a second event for a second one of said transmitter-receiver pairs when, after the first event, a subsequent reflected signal meets the first or a second predetermined proximity criterion. The apparatus 138 also comprises an electronic processor 154 arranged to use the first and second events to identify the movement as the or one of the predetermined movements.

The invention claimed is:

1. A method of recognizing a movement of an object as one of a set of one or more possible predetermined movements, the method comprising:
continuously or repeatedly transmitting acoustic signals between at least two transmitter-receiver pairs, said signals being reflected from an object to produce reflected signals;
analyzing signals received at the receiver of a first one of said transmitter-receiver pairs to determine whether one or more reflected signals, received at the receiver, meets a first predetermined proximity criterion, the first predetermined proximity criterion comprising the reflected signal or signals having a time of flight, or average time of flight, from the transmitter to the receiver of the transmitter-receiver pair, via the object, that is within a first predetermined maximum time of flight, and recording a first event for the first one of said transmitter-receiver pairs when one or more reflected signal meets the first predetermined proximity criterion;
analyzing signals received at the receiver of a second one of said transmitter-receiver pairs to determine whether one or more reflected signals, received at the receiver, meets a second predetermined proximity criterion, the second predetermined proximity criterion comprising the reflected signal or signals having a time of flight, or average time of flight, from the transmitter to the receiver of the transmitter-receiver pair, via the object, that is within a second predetermined maximum time of flight, and recording a second event for the second one of said transmitter-receiver pairs when, after the first event, one or more subsequent reflected signals meets the second predetermined proximity criterion; and
using said first and second events to identify a movement of the object as one of a set of one or more possible predetermined movements.

2. The method of claim 1, wherein a control surface separates the transmitter and receiver of each pair.

3. The method of claim 1, wherein one or both of the first and second predetermined proximity criteria additionally comprises each of the one or more reflected signals containing at least a minimum energy reflected from the object.

4. The method of claim 1, wherein the first event is recorded after the reflected signals corresponding to both the first and the second events have been received.

5. The method of claim 1, further comprising determining quantitative measures of the proximity of the object to each transmitter-receiver pair.

6. The method of claim 5, further comprising recording the first or second events for the transmitter-receiver pair that is closest to the object.

7. The method of claim 1, further comprising using the identity of the transmitter-receiver pairs corresponding to the first and second events, and the order in which the events occurred, to identify said movement of the object as one of the set of one or more possible predetermined movements.

8. The method of claim 1, further comprising using the time interval between the first and second events to identify said movement of the object as one of the set of one or more possible predetermined movements.

9. The method of claim 1, wherein the acoustic signals are acoustic signals.

10. The method of claim 1, wherein the second predetermined proximity criterion is the same as the first predetermined proximity criterion.

11. The method of claim 1, wherein the first or second predetermined proximity criterion comprises the reflected signal or signals having a time of flight, or average time of flight, from the transmitter to the receiver of the transmitter-receiver pair, via the object, that is within a predetermined range interval, the method further comprising detecting whether there is an object present within the predetermined range interval by applying an energy detector, or an edge detector, or an envelope shape detector to corresponding portions of one or more signals received by the first or second transmitter-receiver pairs, or to corresponding portions of impulse responses calculated from signals received by the first or second transmitter-receiver pairs.

12. An apparatus for recognizing a movement of an object as one of a set of one or more possible predetermined movements, comprising:
at least two transmitter-receiver pairs;
electronic controller arranged to:
continuously or repeatedly transmit acoustic signals between the transmitter-receiver pairs, the signals being reflected from an object to produce reflected signals;
analyze signals received at the receiver of a first one of said transmitter-receiver pairs to determine whether one or more reflected signals, received at the receiver, meets a first predetermined proximity criterion, the first predetermined proximity criterion comprising the reflected signal or signals having a time of flight, or average time of flight, from the transmitter to the receiver of the transmitter-receiver pair, via the object, that is within a first predetermined maximum time of flight, and to record a first event for the first one of said transmitter-receiver pairs when one or more reflected signal meets the first predetermined proximity criterion; and
analyze signals received at the receiver of a second one of said transmitter-receiver pairs to determine whether one or more reflected signals, received at the receiver, meets a second predetermined proximity criterion, the second predetermined proximity criterion comprising the reflected signal or signals having a time of flight, or average time of flight, from the transmitter to the receiver of the transmitter-receiver pair, via the object, that is within a second predetermined maximum time of flight, and to record a second event for the second one of said transmitter-receiver pairs when, after the first event, one or more subsequent reflected signals meets the second predetermined proximity criterion; and an electronic processor arranged to use the first and second events to identify a movement of the object as one of a set of one or more possible predetermined movements.

13. The apparatus of claim 12, wherein for each transmitter-receiver pair, the transmitter and receiver of the pair are separated from one another across at least a part of a control surface.

14. The apparatus of claim 13, wherein the transmitter of each transmitter-receiver pair is on an opposite side of the control surface to the paired receiver.

15. The apparatus of claim 13, wherein the control surface comprises a display for an electronic device.

16. The apparatus of claim 13, wherein the control surface is planar and wherein each transmitter-receiver pair comprises a transducer which is mounted flush with or below the plane of the control surface.

17. The apparatus of claim 12, wherein the acoustic signals are acoustic signals.

18. The apparatus of claim 12, wherein the second predetermined proximity criterion is the same as the first predetermined proximity criterion.

19. The apparatus of claim 12, wherein the first or second predetermined proximity criterion comprises the reflected signal or signals having a time of flight, or average time of flight, from the transmitter to the receiver of the transmitter-receiver pair, via the object, that is within a predetermined range interval, and the electronic controller being further arranged to detect whether there is an object present within the predetermined range interval by applying an energy detector, or an edge detector, or an envelope shape detector to corresponding portions of one or more signals received by the first or second transmitter-receiver pairs, or to corresponding portions of impulse responses calculated from signals received by the first or second transmitter-receiver pairs.

20. A non-transitory computer software product configured, when executed on a computer, to recognize a movement of an object as one of a set of one or more possible predetermined movements, the software performing the method comprising:

receiving data resulting from continuously or repeatedly transmitting acoustic signals between at least two transmitter-receiver pairs, the signals being reflected from an object to produce reflected signals;

analyzing signals received at the receiver of a first one of said transmitter-receiver pairs to determine whether one or more reflected signals, received at the receiver, meets a first predetermined proximity criterion, the first predetermined proximity criterion comprising the reflected signal or signals having a time of flight, or average time of flight, from the transmitter to the receiver of the transmitter-receiver pair, via the object, that is within a first predetermined maximum time of flight, and recording a first event for the first one of said transmitter- receiver pairs if the data represents one or more reflected signals meeting the first predetermined proximity criterion;

analyzing signals received at the receiver of a second one of said transmitter-receiver pairs to determine whether one or more reflected signals, received at the receiver, meets a second predetermined proximity criterion, the second predetermined proximity criterion comprising the reflected signal or signals having a time of flight, or average time of flight, from the transmitter to the receiver of the transmitter-receiver pair, via the object, that is within a second predetermined maximum time of flight, and recording a second event for the second one of said transmitter-receiver pairs if, after the first event, the data represents a subsequent one or more reflected signals meeting the second predetermined proximity criterion; and using the first and second events to identify a movement of the object as one of a set of one or more possible predetermined movements.

21. The non-transitory computer software product of claim 20, wherein the second predetermined proximity criterion is the same as the first predetermined proximity criterion.

\* \* \* \* \*